(12) United States Patent
Ramsland et al.

(10) Patent No.: US 11,595,302 B2
(45) Date of Patent: Feb. 28, 2023

(54) CONTROLLING ROUTING BEHAVIOR DURING ROUTER TABLE-MEMORY EXHAUSTION EVENTS

(71) Applicant: Ciena Corporation, Hanover, MD (US)

(72) Inventors: Thor Odd Andres Ramsland, Woodbine, MD (US); Himanshu Shah, Hopkinton, MA (US); Prabhakar Nagral, San Jose, CA (US); Dennis E. Hayes, Mount Laurel, NJ (US); Marc Holness, Nepean (CA)

(73) Assignee: Ciena Corporation, Hanover, MD (US)

( * ) Notice: Subject to any disclaimer, the term of this patent is extended or adjusted under 35 U.S.C. 154(b) by 16 days.

(21) Appl. No.: 17/030,205

(22) Filed: Sep. 23, 2020

(65) Prior Publication Data

US 2022/0094635 A1   Mar. 24, 2022

(51) Int. Cl.
*H04L 12/741* (2013.01)
*H04L 12/755* (2013.01)
*H04L 12/715* (2013.01)
*H04L 12/733* (2013.01)
*H04L 45/00* (2022.01)
*H04L 45/021* (2022.01)
*H04L 45/745* (2022.01)
*H04L 45/02* (2022.01)

(52) U.S. Cl.
CPC ............ *H04L 45/54* (2013.01); *H04L 45/021* (2013.01); *H04L 45/04* (2013.01); *H04L 45/20* (2013.01); *H04L 45/745* (2013.01)

(58) Field of Classification Search
CPC ....... H04L 45/54; H04L 45/021; H04L 45/04; H04L 45/20; H04L 45/745
See application file for complete search history.

(56) References Cited

U.S. PATENT DOCUMENTS

| 6,888,838 | B1 * | 5/2005 | Ji ............................ H04L 45/54 370/392 |
| 7,386,605 | B2 | 6/2008 | Shah |
| 7,430,176 | B2 | 9/2008 | Nalawade et al. |
| 7,532,631 | B2 | 5/2009 | Raszuk et al. |

(Continued)

OTHER PUBLICATIONS

Rekhter et al., Network Working Group, Category: Standards Track, A Border Gateway Protocol 4 (BGP-4), The Internet Society, Jan. 2006, pp. 1-105.

(Continued)

*Primary Examiner* — Derrick V Rose
(74) *Attorney, Agent, or Firm* — Baratta Law PLLC; Lawrence A. Baratta, Jr.

(57) ABSTRACT

Systems and methods include obtaining a table having a plurality of addresses each having a plurality of attributes and classifications; responsive to a requirement to reduce a size of the table, reducing a number of the plurality of addresses based on one or more reduction approaches that use any of the plurality of attributes and classifications; and obtaining an output table having some or all of the plurality of addresses for a table receiver. The table can be obtained via control plane components including one or more of Interior Gateway Protocol (IGP) and Border Gateway Protocol (BGP). The requirement to reduce the size is based on a size of the table and a size of memory associated with the table receiver.

20 Claims, 5 Drawing Sheets

(56) References Cited

U.S. PATENT DOCUMENTS

| | | | |
|---|---|---|---|
| 8,259,590 B2 | 9/2012 | Shah et al. | |
| 8,295,175 B2 | 10/2012 | Ellis et al. | |
| 8,295,278 B2 | 10/2012 | Shah et al. | |
| 8,547,851 B1 | 10/2013 | Jacobson et al. | |
| 8,572,281 B1 | 10/2013 | Jesuraj | |
| 8,817,798 B2 | 8/2014 | Skalecki et al. | |
| 9,075,717 B2 | 7/2015 | Mohan, Jr. et al. | |
| 9,166,929 B1 | 10/2015 | Kamath et al. | |
| 9,401,817 B2 | 7/2016 | Holness et al. | |
| 9,491,058 B2 | 11/2016 | Filsfils et al. | |
| 9,893,937 B2 | 2/2018 | Holness et al. | |
| 10,277,558 B2 | 4/2019 | Khan et al. | |
| 10,652,024 B2 | 5/2020 | Holness | |
| 2005/0068950 A1 | 3/2005 | Ellis et al. | |
| 2007/0140107 A1* | 6/2007 | Eckert | H04L 45/00 370/216 |
| 2012/0099858 A1 | 4/2012 | Moore et al. | |
| 2013/0100955 A1* | 4/2013 | Dunlap | H04L 47/20 370/392 |
| 2015/0003295 A1 | 1/2015 | Bottorff et al. | |
| 2017/0264494 A1* | 9/2017 | Lim | H04L 41/0813 |
| 2018/0048566 A1* | 2/2018 | Bannister | H04L 45/54 |
| 2018/0359323 A1 | 12/2018 | Madden | |
| 2018/0367501 A1* | 12/2018 | Khan | H04L 41/22 |
| 2019/0342208 A1* | 11/2019 | Osborne | H04L 45/54 |
| 2020/0112495 A1 | 4/2020 | Attarwala et al. | |

OTHER PUBLICATIONS

Sangli et al., Network Working Group, Category: Standards Track, BGP Extended Communities Attribute, The Internet Society, Feb. 2006, pp. 1-12.

* cited by examiner

US 11,595,302 B2

CONTROLLING ROUTING BEHAVIOR DURING ROUTER TABLE-MEMORY EXHAUSTION EVENTS

FIELD OF THE DISCLOSURE

The present disclosure generally relates to networking. More particularly, the present disclosure relates to systems and methods for controlling routing behavior during router table-memory exhaustion events.

BACKGROUND OF THE DISCLOSURE

The introduction of merchant silicon network processing devices has lowered the cost of entry for networking platforms, i.e., routers. However, these routers often have forwarding tables of such limited capacity that they cannot support the full internet routing table. Of note, various terms are utilized herein for a table, namely a routing table, a forwarding table, a prefix table, etc. Those skilled in the art will recognize these all relate to a similar concept of a table of addresses, and the distinction is based on the use case. For example, hardware implementations refer to this as a forwarding table (also referred to as a Forwarding Information Base (FIB)). Software implementations refer to this as a routing table (also referred to as a Routing Information Base (RIB)). Border Gateway Protocol (BGP) implementations refer to this as a prefix table. For generality, these concepts can be referred to simply as a "table." As is known in the art, a table is utilized to specify next-hop forwarding. For example, for illustrating this limitation, a full complement of Internet routes may include 800 k or more routes, whereas network processing devices may be limited to support a subset, such as 200 k or so routes, in memory. One solution to address this limitation, to support the full internet routing table, includes the addition of Ternary Content-Addressable Memory (TCAM) to sufficiently expand the table capacity to carry full Internet routes.

With the modernization of the Internet, the number of Internet Protocol (IP) addresses has increased multi-fold. Service providers are constantly challenged to manage constantly growing IP addresses with the limited capacity of the platforms in the field, increasingly made up of merchant silicon platforms with limited table memory capacity. It is also true that not every node in the network needs to handle all the IP addresses that are present in the network and can prune with discrimination based on the regions they are in or the services that they offer. It is desirable to have a mechanism whereby an operator can control the packet forwarding table resources intelligently such that the table is primed with IP prefixes that meets the criteria defined by the operator for the given node in cases where other such mechanisms fail.

In the absence of sufficient table memory, software mechanisms may be employed to control and limit the installation of routes into a router's table to prevent exceeding its route capacity. There are no known solutions for predictable and controllable management of a limited-sized hardware forwarding memory if a larger table overruns it. Some mechanisms exist to avoid this event, such as custom Application Specific Integrated Circuit (ASIC) design with large allocations of hardware-forwarding memory, augmentation of merchant silicon forwarding tables external TCAM, avoiding deployment scenarios which include protocols with large prefix counts, such as BGP, and employing features such as BGP table-map to limit the number of BGP routes that ultimately reach the FIB.

None of these solutions enable predictable and controllable FIB memory management and prefix installation during memory-exhaustion events. Custom ASIC design is expensive and drives up product costs. External TCAM with merchant silicon also adds significant cost to hardware solutions. Avoiding BGP altogether and advertisements of the full Internet table between peers limits the applicability of products with limited FIB memory. The use of Table-Maps to limit the number of routes passed from BGP to the global RIB cannot guarantee the FIB is not overrun.

BRIEF SUMMARY OF THE DISCLOSURE

The present disclosure relates to systems and methods for controlling routing behavior during router table-memory exhaustion events. The advent and use of limited-forwarding-table-memory merchant silicon for use in the IP/MPLS router systems creates opportunities for forwarding table memory exhaustion, and unpredictable and uncontrollable behavior should such exhaustion occur. Without predictable and controllable behavior, recovery of a router whose FIB memory has been exhausted may be challenged depending on the management interface implementation, if the router, for example, becomes unreachable from the management network because those routes were excluded from the fully-utilized FIB. Furthermore, important customer reachability could be lost, even though there may be enough memory to maintain connectivity with those customers. The present disclosure includes the introduction of operator control of the router's behavior in such a forwarding-table-memory-exhaustion event, enabling a predictable and graceful routing-failure mode should memory become exhausted. The present disclosure overcomes the shortcomings by providing controllable and graceful behavior should the FIB memory become exhausted. It does so by allowing the operator to both pre-classify and pre-prioritize which routes will be installed and/or preserved should FIB-memory-exhaustion occur or nearly occur. It also enables operator notification ahead of such an exhaustion event.

In an embodiment, a method and a non-transitory computer-readable medium include instructions stored thereon for programming a processing device to perform steps. The steps include obtaining a table having a plurality of addresses each having a plurality of attributes and classifications; responsive to a requirement to reduce a size of the table, reducing a number of the plurality of addresses based on one or more reduction approaches that use any of the plurality of attributes and classifications; and obtaining an output table having some or all of the plurality of addresses for a table receiver. The obtaining the table can be via control plane components including one or more of Interior Gateway Protocol (IGP) and Border Gateway Protocol (BGP). The requirement to reduce the size can be based on a size of the table and a size of memory associated with the table receiver. When there is no requirement to reduce the size, the output table has a same number of the plurality of addresses as the table. The one or more reduction approaches can utilize one or more of the plurality of attributes to sort the plurality of addresses with the reducing based on the sorted plurality of addresses. The classifications can be added by control plane components, and wherein the one or more reduction approaches utilize the classifications. The classifications can be any of priority-based, weightings, and hard partitioning per class. The classifications can be used for any of a current prefix and a next-hop prefix.

In another embodiments, a router includes a plurality of ports and a switching fabric interconnecting the plurality of ports; and a controller having memory for storing a forwarding table therein, wherein the controller is configured to provide a size of the memory for the forwarding table, wherein the size of the forwarding table is less than a size of a table having a plurality of addresses each having a plurality of attributes and classifications, obtain a reduced size table that has a reduction in a number of the plurality of addresses based on one or more reduction approaches that use any of the plurality of attributes and classifications, and store the reduced size table in the memory. The table can be obtained from control plane components including one or more of Interior Gateway Protocol (IGP) and Border Gateway Protocol (BGP). The one or more reduction approaches can utilize one or more of the plurality of attributes to sort the plurality of addresses with the reducing based on the sorted plurality of addresses. The classifications can be added by control plane components, and wherein the one or more reduction approaches utilize the classifications.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for controlling routing behavior during router table-memory exhaustion events. The advent and use of limited-forwarding-table-memory merchant silicon for use in the IP/MPLS router systems creates opportunities for forwarding table memory exhaustion, and unpredictable and uncontrollable behavior should such exhaustion occur. Without predictable and controllable behavior, recovery of a router whose FIB memory has been exhausted may be challenged depending on the management interface implementation, if the router, for example, becomes unreachable from the management network because those routes were excluded from the fully-utilized FIB. Furthermore, important customer reachability could be lost, even though there may be enough memory to maintain connectivity with those customers. The present disclosure includes the introduction of operator control of the router's behavior in such a forwarding-table-memory-exhaustion event, enabling a predictable and graceful routing-failure mode should memory become exhausted. The present disclosure overcomes the shortcomings by providing controllable and graceful behavior should the FIB memory become exhausted. It does so by allowing the operator to both pre-classify and pre-prioritize which routes will be installed and/or preserved should FIB-memory-exhaustion occur or nearly occur. It also enables operator notification ahead of such an exhaustion event.

Acronyms

The following table includes a list of the acronyms used herein:

| | |
|---|---|
| AS | Autonomous System |
| ASIC | Application Specific Integrated Circuit |
| BGP | Border Gateway Protocol |
| CE | Customer Edge |
| eBGP | External BGP |
| FIB | Forwarding Information Base (also referred to as a forwarding table) |
| iBGP | Internal BGP |
| IGP | Interior Gateway Protocol |
| IP | Internet Protocol |
| ISIS | Intermediate System-Intermediate System |
| MPLS | Multiprotocol Label Switching |
| OSPF | Open Shortest Path First |
| PE | Provider Edge |
| RIB | Routing Information Base (also referred to as a routing table) |
| SAG | Service Aggregation Gateway |
| TCAM | Ternary Content-Addressable Memory |

Table Generation

Figure 1:
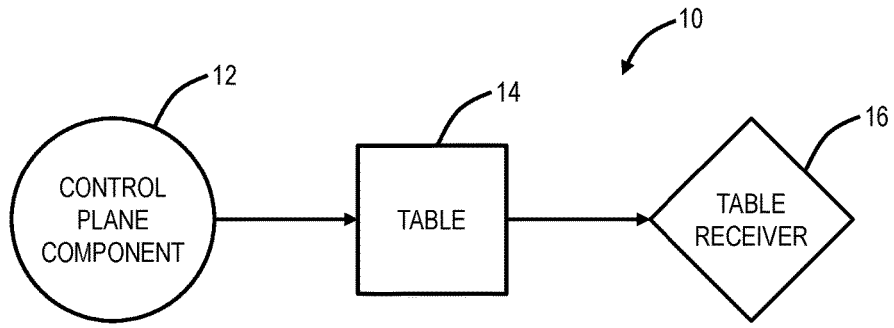
FIG. 1 is a diagram of a table generation system.

FIG. 1 is a diagram of a table generation system 10. The table generation system 10 includes a control plane component 12, a table 14, and a table receiver 16. The table generation system 10 is logically illustrated with the control plane component 12 representing a control plane such as BGP, IGP, etc. The control plane component 12 can include software processes executed on hardware devices for implementing a control plane, e.g., BGP, IGP, etc. The table 14 includes data such as the prefix table, the routing table, the forwarding table, etc. The table receiver 16 includes a router, a network element, etc. The table receiver 16 can include a physical device that is configured to receive the table 14 from the control plane component 12. As described herein, the table receiver 16 can have limited memory that can cause memory table exhaustion.

For example, a router's BGP or IGP processes (control plane components 12) may deliver a protocol-specific prefix table (table 14) to the global routing process (table receiver 16). Likewise, the global routing process (control plane components 12) may deliver a forwarding table (table 14) to a hardware forwarding engine (table receiver 16). Of course, other embodiments are also contemplated consistent with this flow, namely control plane components 12 providing the table 14 to the table receiver 16. Those skilled in the art will recognize the table generation system 10 can be a method, implemented via one or more processors, and embodied as computer-readable code for programming one or more processors.

Again, various terms are utilized herein for the table 14, namely a routing table, a forwarding table, a prefix table, etc. Those skilled in the art will recognize these all relate to a similar concept of a table of addresses, and the distinction is based on the use case. The present disclosure addresses limitation in physical memory, i.e., the table receiver 16, to support a full table. In the following descriptions, various terms are used, including a forwarding table or FIB, routing table or RIB, prefix table, etc. Again, the forwarding table or FIB is for hardware, the routing table or RIB is for software, and the prefix table is for BGP. Those skilled in the art will recognize these are all similar concepts, and when the term "table" is used by itself, this is meant to cover all such embodiments.

Adaptive Table Reduction

Figure 2:
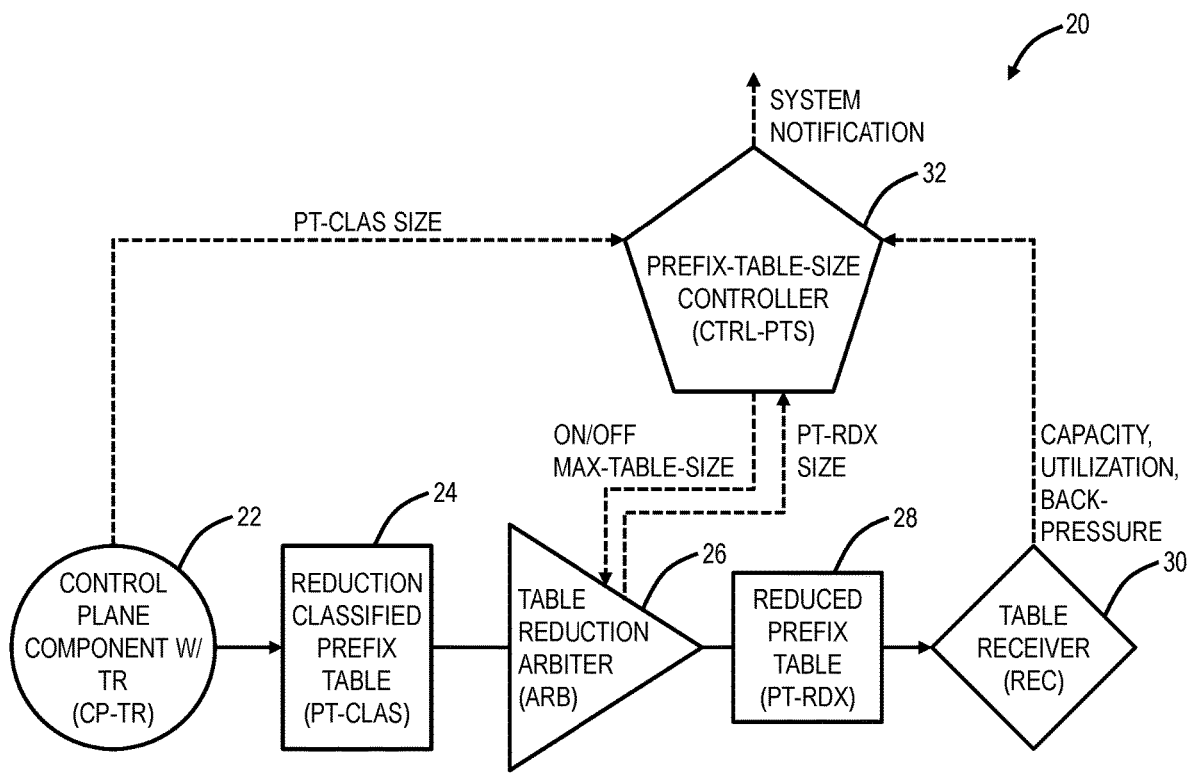
FIG. 2 is a diagram of a table generation system configured to implement adaptive table reduction.

FIG. 2 is a diagram of a table generation system 20 configured to implement adaptive table reduction. Generally, the table generation system 20 is configured to reduce the size of the table 14 from the control plane components 12 before (or at) the table receiver 16. The table generation system 20 applies to IPv4 and IPv6 implementations. The table generation system 20 includes a control plane component 22 with a table-reduction-classification (CP-TR), a reduction classified prefix table 24 (PT-CLAS), a table reduction arbiter 26 (ARB), a reduced prefix table 28 (PT-RDX), a table receiver 30 (REC), and a prefix-table-size controller 32 (CTRL-PTS). Those skilled in the art will recognize the components illustrated in the table generation system 20 provide a functional description, and various physical implementations are contemplated.

Adaptive Table Reduction Operation

Figure 3:
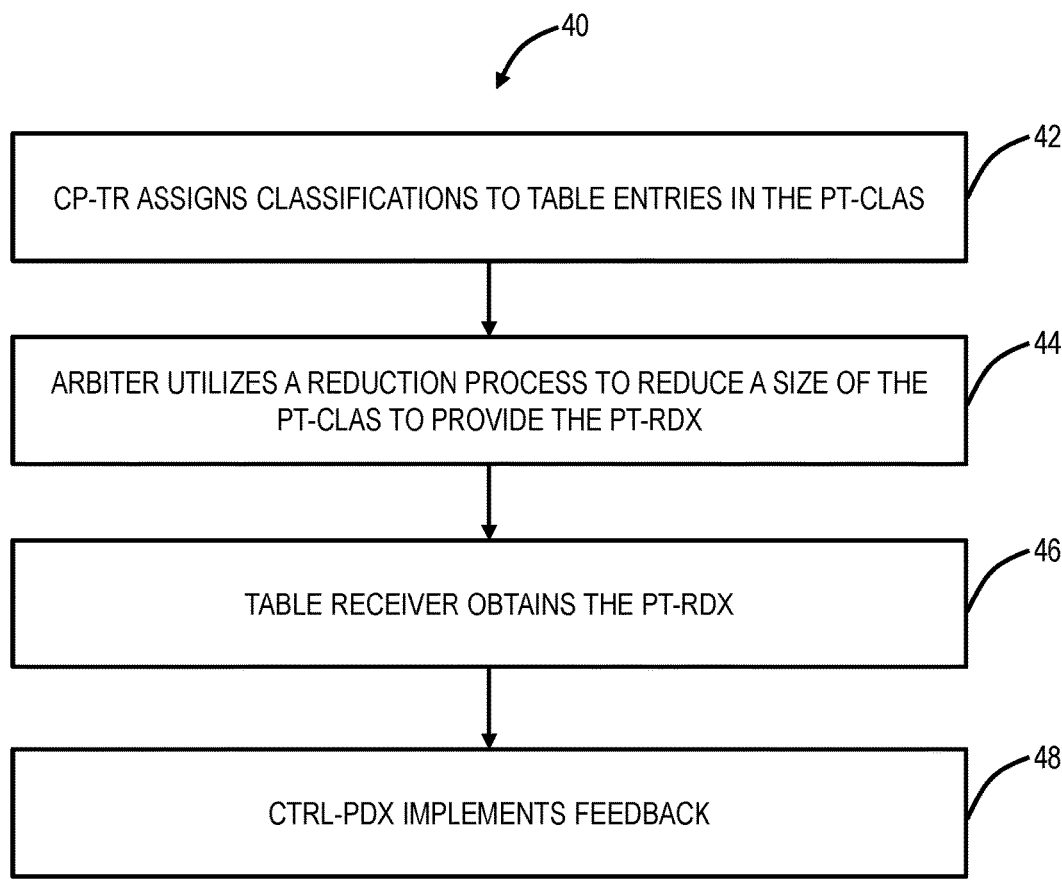
FIG. 3 is a flowchart of an adaptive table reduction process implemented through the table generation system of FIG. 2.

FIG. 3 is a flowchart of an adaptive table reduction process 40 implemented through the table generation system 20. For illustration purposes, the adaptive table reduction process 40 is described with reference to BGP and an associated prefix table. The control plane component 22 (CP-TR) assigns a classification to table entries in the prefix table 24 (PT-CLAS) (step 42). Here, in addition to typical attributes associated with router control plane components 22 (CP-TR), the control plane components 22 can assign a Prefix-Table-Reduction Class (PTR-Class) to each prefix it outputs in the prefix table 24 (PT-CLAS). The control plane components 22 can report the size of the prefix table 24 (PT-CLAS size) to the controller 32 (CTRL-PTS).

Figure 4:
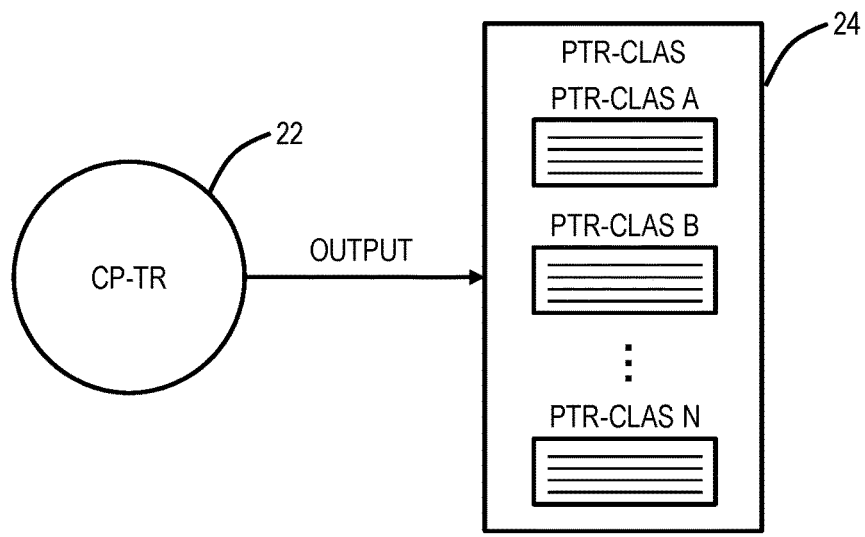
FIG. 4 is a diagram illustrating the control plane components outputting the prefix table (PTR-CLAS) with prefix-table-reduction classes, in the adaptive table reduction process of FIG. 3.

The prefix table 24 (PT-CLAS) output by the control plane components 22 have each prefix optionally marked with a prefix-table-reduction class (PTR-Class). FIG. 4 is a diagram illustrating the control plane components 22 outputting the prefix table 24 (PT-CLAS) with prefix-table-reduction classes. This PTR-Class is utilized by the arbiter 26 to reduce the size of the prefix table 24 via a reduction process to obtain the reduced prefix table 28 (PT-RDX) (step 44). The arbiter 26 can report the reduced prefix table 28 size to the controller 32. In an ON state, where adaptive table reduction process 40 is enabled, the reduction process at the arbiter 26 can reduce the prefix table 24 to a MAX-TABLE-SIZE, outputting the reduced prefix table 28 (PT-RDX). In an OFF state, PT-RDX=PT-CLAS.

The adaptive table reduction process 40 contemplates various reduction approaches, each of which is configured to remove entries from the prefix table 24 (PTR-CLAS) as input for the reduced prefix table 28 (PT-RDX) as output. The reduction approaches can be categorized as including 1) classless or single PTR-Class reduction approaches and 2) class-based reduction approaches. The classless or single PTR-Class reduction approaches use available known attributes to filter entries. The class-based reduction approaches look at some criteria, such as priority, weight, etc. Of course, any combination of these approaches is contemplated herein.

Again, as described herein, the PTR-Class is something associated with each entry in the table 24 from the control plane components 22 that can be used to differentiate entries to decide which ones are allowed through to the reduced prefix table 28 and which ones are dropped to reduce size.

The classless or single PTR-Class reduction approaches utilize individual attributes/sorting based on some columns in the prefix table 24. Example attributes can include, without limitation, age, prefix-length, prefix-length per next hop, originating routing protocol, and other typical prefix record fields. The attributes can be used to sort/differentiate records for reduction. For the age, the sorting can be the oldest first or newest first. For prefix-length and prefix-length per next hop, the sorting can be the longest first or shortest first. The sorting criteria can be used to determine how many entries are removed. Note, thresholds for the sorting are based on the prefix table 24 size (PT-CLAS size) and the MAX-TABLE-SIZE. That is, the amount of reduction is relative based on what the MAX-TABLE-SIZE is for the table receiver 30. Each attribute plus sorting criteria can be referred to as a reduction rule or preference. Also, reduction rules can be used in combination. For example, the arbiter 26 can employ a prefix-length preference followed by an age preference.

The PTR-Class-based reduction approaches can apply some categorization, e.g., Green/Yellow/Red, High/Low, etc. The PTR-Class-based reduction approaches can include a priority-based preference. For example, a priority value is assigned to each PTR-Class. Prefixes are installed into PT-RDX in order of their PTR-Class priority.

The PTR-Class-based reduction approaches can include a weighted preference where a relative weight is assigned to each PTR-Class. Prefixes are installed into the reduced prefix table 28 (PT-RDX) in proportion to the relative weight of their respective PTR-Classes.

The PTR-Class-based reduction approaches can also include hard partitioning where a maximum prefix count or memory value is assigned to each PTR-Class. Prefixes of a given PTR-Class are installed into the reduced prefix table 28 (PT-RDX) up to but not exceeding the maximum value of the respective PTR-Class.

For PTR-Class-based reduction approaches, should a class exceed its allocated prefix count or memory allotment, a single PTR-class reduction may be used for the prefixes within that class.

Accordingly, the adaptive table reduction process 40 can sort entries for deciding which ones to allow or remove based on classless or single PTR-Class reduction approaches and PTR-Class-based reduction approaches.

Also, there are Class-based reduction modes that distinguish between a prefix-class and a next-hop prefix-class as well as a combination thereof. In the prefix-class mode, the PTR-Class of a given prefix in the prefix table 24 (PT-CLAS) is used by the arbiter 26 (ARB) in its reduction algorithm. In the next-hop prefix-class mode, the PTR-Class of a given prefix's next-hop in the prefix table 24 (PT-CLAS) is used by the arbiter 26 (ARB) in its reduction algorithm. In a combined mode, the PTR-Class of both the prefix and its next-hop are used by the arbiter 26 (ARB) in its reduction algorithm.

The table receiver 30 (REC) obtains the reduced prefix table 28 (PT-RDX) (step 46). The output of the arbiter 26 (ARB) can be the reduced prefix table 28 (PT-RDX), which is either the same size as the prefix table 24 (PT-CLAS) (when reduction is off) or is a reduces size from the prefix table 24 (PT-CLAS) (when reduction is on). The size of the reduction can be based on the MAX-TABLE-SIZE, and the scope of the reduction is based on which of the reduction approaches and reduction modes applied by the arbiter 26 (ARB).

Also, the output of the arbiter 26 (ARB) to the table receiver 30 (REC) may be a set of instructions such as adding a single or set of prefixes; removing a prefix or set of prefixes; or removing a class of prefixes from the table receiver's prefix-store. That is, the functional removal of entries from the prefix table 24 (PT-CLAS) may be performed by the arbiter 26 (ARB) or the table receiver 30 (REC). When the arbiter 26 (ARB) performs the removal, the table receiver 30 (REC) receives the reduced prefix table 28 (PT-RDX). When the table receiver 30 (REC) performs the removal, the table receiver 30 (REC) may receive the full prefix table 24 (PT-CLAS) with the instructions from the arbiter 26 (ARB) with the instructions used to forms the reduced prefix table 28 (PT-RDX). Those skilled in the art will recognize various implementation choices are contemplated herein.

The table receiver 30 (REC) receives and installs the reduced prefix table 28 (PT-RDX), and can provide capacity details to the controller 32 (CTRL-PTS), and optionally utilization and backpressure messaging as well. The controller 32 (CTRL-PTS) can implement a feedback loop between the control plane components 22 (CP-TR), the arbiter 26 (ARB), and the table receiver 30 (REC) (step 48). The controller 32 (CTRL-PTS) can stores capacity for table receiver 30 (REC), such as either programmed manually or retrieved dynamically from table receiver 30 (REC). The controller 32 (CTRL-PTS) can determine the MAX-TABLE-SIZE derived from table receiver 30 (REC) capacity. The controller 32 (CTRL-PTS) can signal the arbiter 26 (ARB) "ON" with the MAX-TABLE-SIZE when the prefix table 24 (PT-CLAS) is greater than or equal to the MAX-TABLE-SIZE, or when the prefix table 24 (PT-CLAS) is greater than or equal some threshold. For example, the threshold can be a [system-configured or operator-configured capacity threshold %]*MAX-TABLE-SIZE. The controller 32 (CTRL-PTS) can also notify the system 20 of key operational states and activities, thereby enabling the system to take additional actions such as event notifications to network and fault management systems, event-driven configurations changes, or other relevant processes.

Also, in an embodiment, it is possible the table receiver 30 (REC) exceeds an overrun, and this can be detected by the controller 32 (CTRL-PTS). Also, an output at any stage in the table generations system 20 could ultimately exceed the FIB or physical memory of the table receiver 30 (REC). Any of such events could then be the basis of an automated task, such as rollback to a pre-configured "safe" configuration. For example, instantiate a pre-determined table-map, IGP configuration, etc., or rollback to the previous configuration.

The various functions and components in the table generation system 20 and the adaptive table reduction process 40 need not be separate entities but may be combined into existing processes or spread across multiple processes. Also, the various functions and components can be implemented in the table generation system 10. The present disclosure is inclusive of both IPv4 and IPv6 implementations.

Example Implementation

Figure 5:
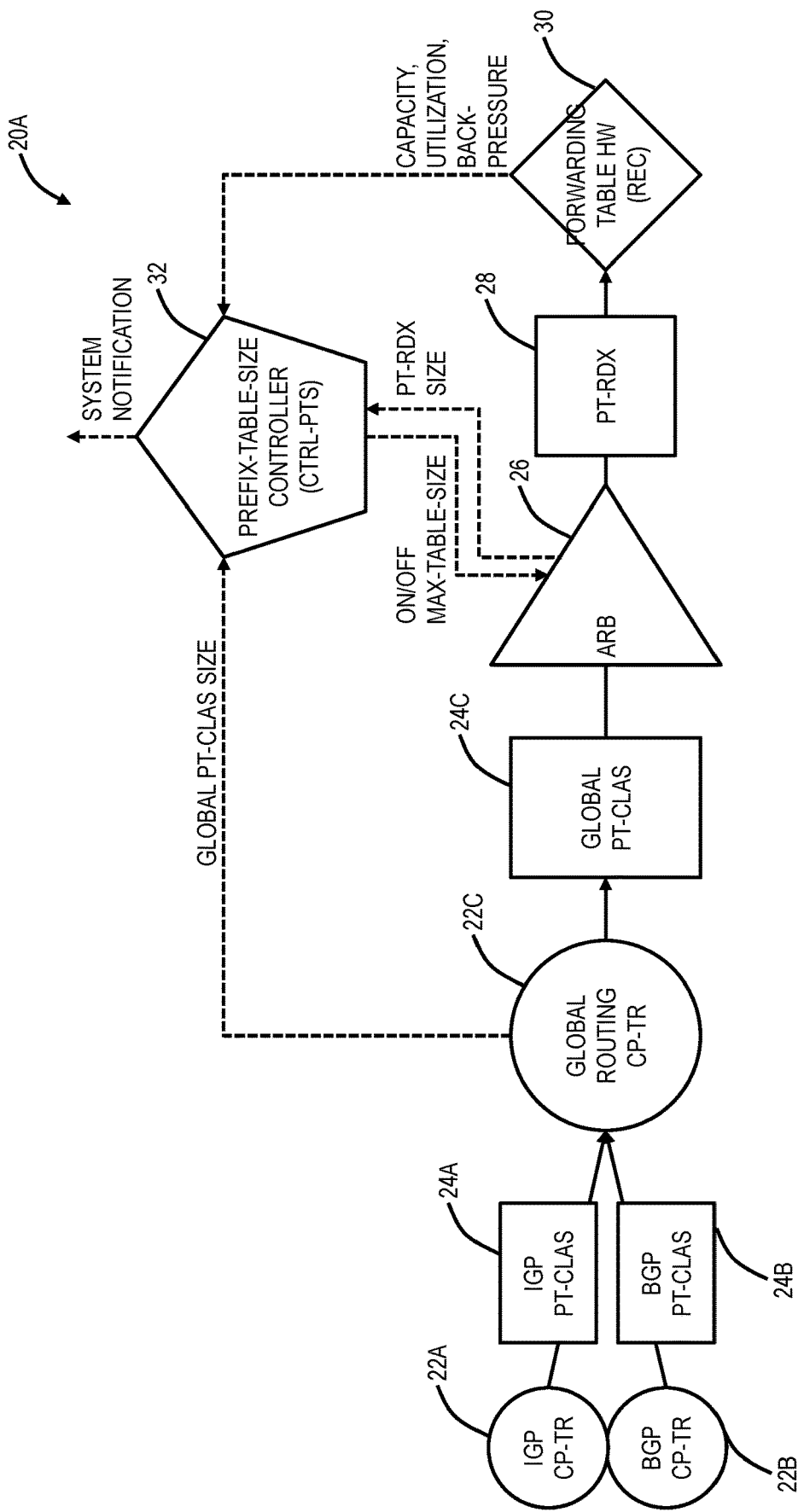
FIG. 5 is a diagram of an example illustration of a table generation system.

FIG. 5 is a diagram of an example illustration of a table generation system 20A. In this example, the classification function is distributed across several processes, namely IGP control plane components 22A (IGP CP-TR) and BGP control plane components 22B (BGP CP-TR). Each of the control plane components 22A, 22B produces its respective prefix table 24A, 24B (IGP PT-CLAS and BGP PT-CLAS) that is delivered to a global routing process, namely a global control plane component 22C (global CP-TR). The global control plane component 22C performs the typical global routing process, creating a global RIB as a global prefix table 24C (global PT-CLAS), where the PTR-Class of each route is inherited from the upstream CP-TR 22A, 22B, and could be further manipulated within the control plane component 22C (global CP-TR). The control plane component 22C (global CP-TR) outputs the global prefix table 24C (global PT-CLAS), subject to the arbiter 26 (ARB) function for table reduction should the controller 32 (CTRL-PTS) signal the ARB to "ON." The reduced prefix table 28 (PT-RDX) would be delivered to the table receiver 30 (REC), which in this case can be a forwarding table, such that the entire PT-RDX fits in the allocated memory.

Table Reduction Process

Figure 6:
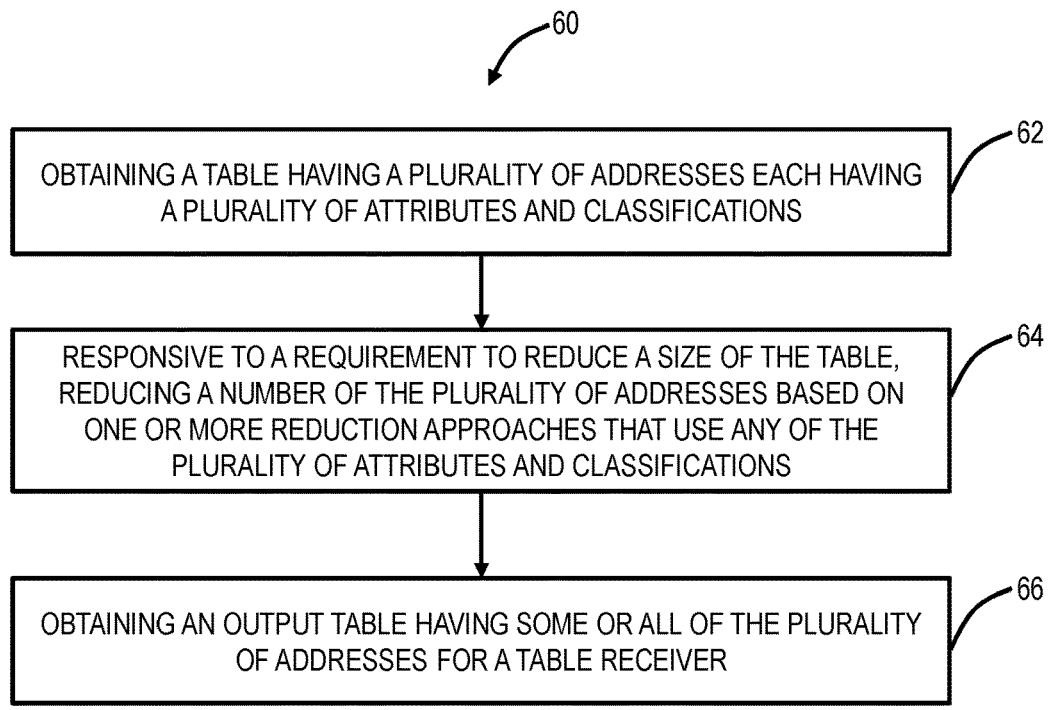
FIG. 6 is a flowchart of a table reduction process implementable by the table generation system of FIG. 2.

FIG. 6 is a flowchart of a table reduction process 60 implementable by the table generation system 20. The table reduction process 60 can be implemented by the various components and/or functions in the table generation system 20. Also, the table reduction process 60 can be realized as a method, via a processing device, and as a non-transitory computer-readable medium having instructions stored thereon for programming a processing device to perform the associated steps.

The table reduction process 60 includes obtaining a table having a plurality of addresses, each having a plurality of attributes and classifications (step 62); responsive to a requirement to reduce a size of the table, reducing the number of the plurality of addresses based on one or more reduction approaches that use any of the plurality of attributes and classifications (step 64); and obtaining an output table having some or all of the plurality of addresses for a table receiver (step 66).

The obtaining the table can be via control plane components, including one or more of Interior Gateway Protocol (IGP) and Border Gateway Protocol (BGP). The requirement to reduce the size can be based on a size of the table and a size of memory associated with the table receiver. When there is no requirement to reduce the size, the output table has a same number of the plurality of addresses as the table. The one or more reduction approaches can utilize one or more of the plurality of attributes to sort the plurality of addresses with the reduction based on the sorted plurality of addresses. The classifications can be added by control plane components, and wherein the one or more reduction approaches can utilize the classifications. The classifications can be any of priority-based, weightings, and hard partitioning per class. The classifications can be used for any of a current prefix and a next-hop prefix.

Controller Process

Figure 7:
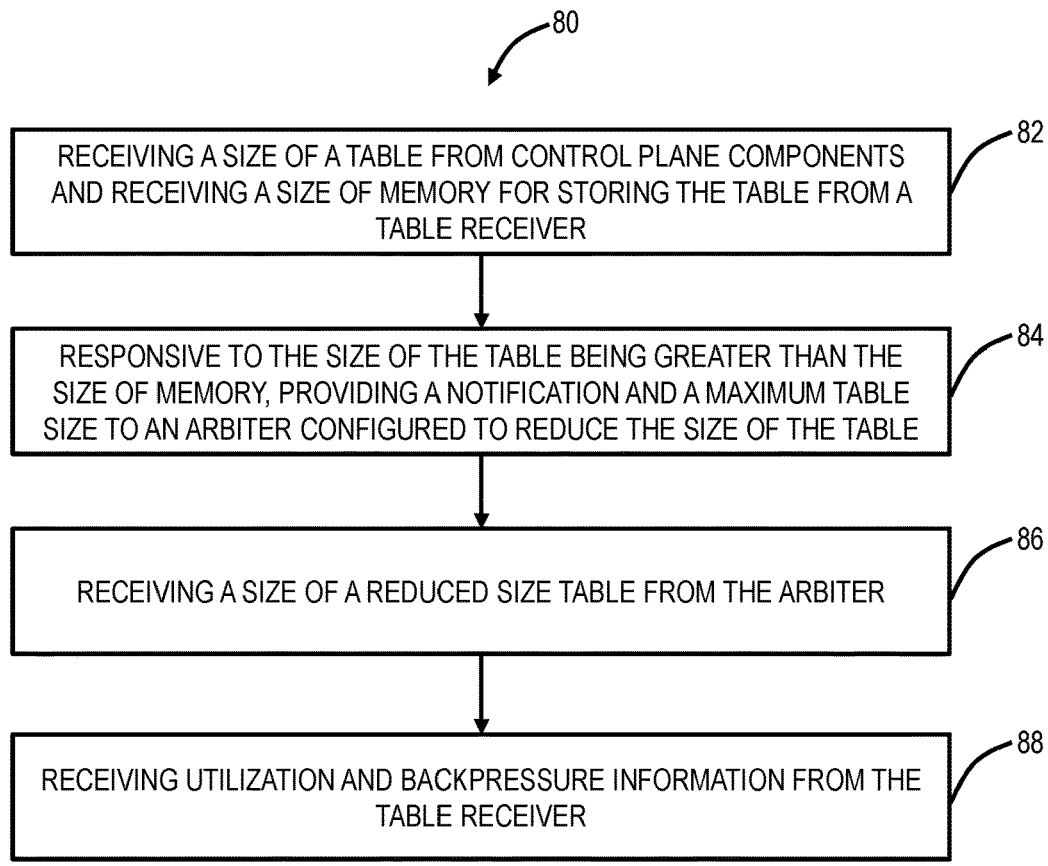
FIG. 7 is a flowchart of a controller process implemented by the controller in the table generation system of FIG. 2.

FIG. 7 is a flowchart of a controller process 80 implemented by the controller 32 in the table generation system 20. Also, the controller process 80 can be realized as a method, via a processing device, and as a non-transitory computer-readable medium having instructions stored thereon for programming a processing device to perform the associated steps.

The controller process 80 includes receiving a size of a table from control plane components and receiving a size of memory for storing the table from a table receiver (step 82); responsive to the size of the table being greater than the size of the memory, providing a notification and a maximum table size to an arbiter configured to reduce the size of the table (step 84); receiving a size of a reduced size table from the arbiter (step 86); and receiving utilization and backpressure information from the table receiver (step 88).

Example Router

Figure 8:
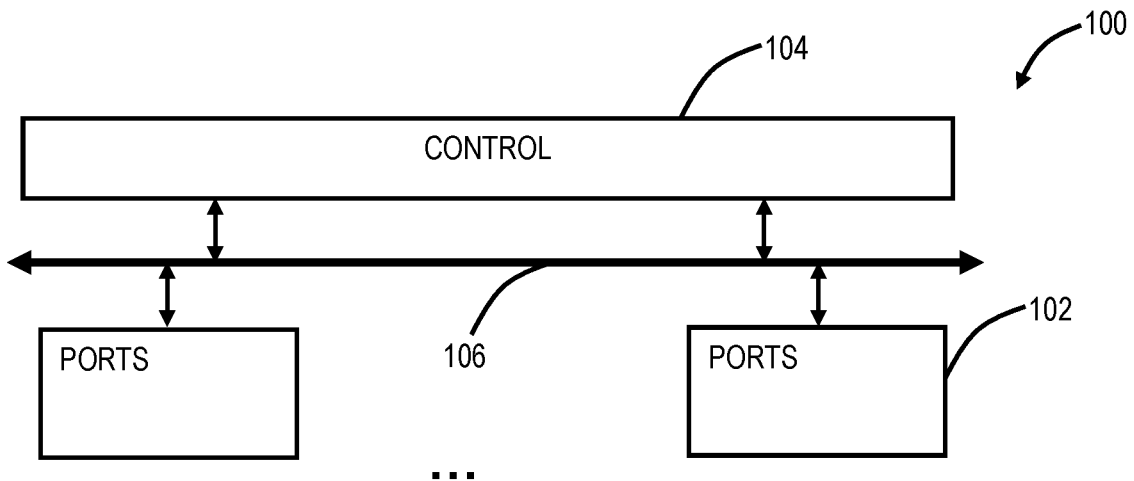
FIG. 8 is a block diagram of an example implementation of a router.

FIG. 8 is a block diagram of an example implementation of a router 100. Those of ordinary skill in the art will recognize FIG. 8 is a functional diagram in an oversimplified manner, and a practical embodiment may include additional components and suitably configured processing logic to support known or conventional operating features that are not described in detail herein.

In an embodiment, the router 100 includes a plurality of ports 102, a controller 104, and a switching fabric 106 interconnecting the plurality of ports 102 to one another and connecting the plurality of ports 102 to the controller 104. The plurality of ports 102 can be on modules, blades, line cards, line modules, circuit packs, pluggable modules, etc. and generally refer to components mounted on a chassis, shelf, etc. of a data switching device. Each of the ports 102 can include or connect to various electronic devices and/or optical devices mounted on a circuit board along with various interconnects, including interfaces to the chassis, shelf, etc.

Additionally, the switching fabric 106 can include switching components to form a switching fabric between all of the ports 106, allowing data traffic to be switched/forwarded/routed between the ports 106. The switching fabric 106 is a combination of hardware, software, firmware, etc. that moves data coming into the router 100 out by the correct port 102 to the next node 100. "Switching fabric" includes switching units in a node; integrated circuits contained in the switching units; and programming that allows switching paths to be controlled. Note, the switching fabric 104 can be distributed on modules housing the ports 102, in a separate module (not shown), or a combination thereof.

The controller 104 can include a microprocessor, memory, software, and a network interface. Specifically, the microprocessor, the memory, and the software can collectively control, configure, provision, monitor, etc. the router 100. The controller 104 can include physical memory for storing the table described herein. Again, the size of this physical memory can be constrained, requiring the various techniques described herein for reducing table size.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules is built-in, i.e., a "pizza-box" configuration. That is, FIG. 8 is meant to provide a functional view, and those of ordinary skill in the art will recognize actual hardware implementations may vary.

Example Controller

Figure 9:
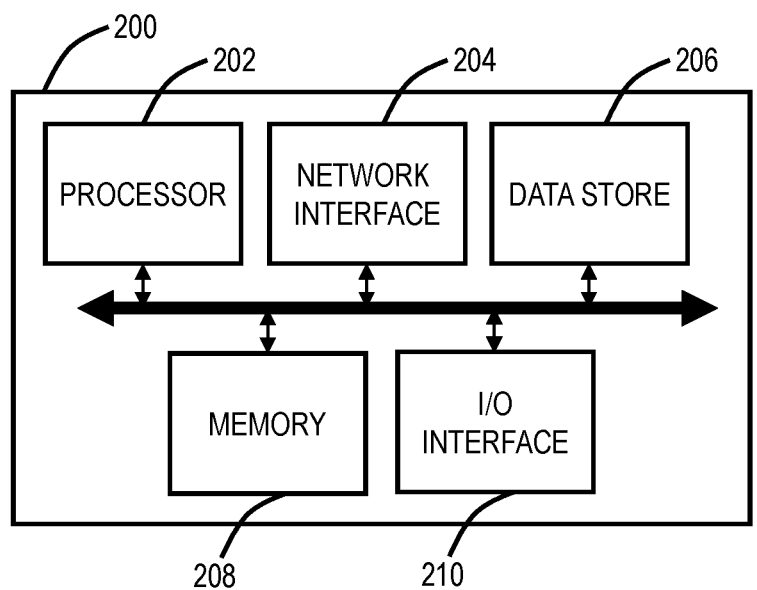
FIG. 9 is a block diagram of an example processing device, which can form a controller for the router of FIG. 8, as well as form the basis of a device performing the adaptive table reduction process of FIG. 6.

FIG. 9 is a block diagram of an example processing device 200, which can form a controller 104 for the router, as well as form the basis of a device performing the adaptive table reduction process 40. The processing device 200 can include a processor 202, which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, a processing device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processing device to perform steps of:
obtaining a table having a plurality of prefixes each having a plurality of attributes and classifications;
receiving a size of the table and receiving a size of memory for storing the table, and determining whether or not there is a requirement to reduce the size of the table based thereon;
responsive to the requirement to reduce the size of the table, reducing a number of the plurality of prefixes based on one or more reduction approaches, configured by an operator to control reduction of the size of the table, that use any of the plurality of attributes and classifications, wherein the one or more reduction approaches are selected based on the operator's configuration and the requirement;
responsive to the requirement, obtaining an output table having some of the plurality of prefixes removed therefrom based on the one or more reduction approaches; and
providing the output table to a table receiver.

2. The non-transitory computer-readable medium of claim 1, wherein the obtaining the table is via control plane components including one or more of Interior Gateway Protocol (IGP) and Border Gateway Protocol (BGP).

3. The non-transitory computer-readable medium of claim 1, wherein, when there is no requirement to reduce the size, the output table has a same number of the plurality of prefixes as the table.

4. The non-transitory computer-readable medium of claim 1, wherein the one or more reduction approaches utilize one or more of the plurality of attributes to sort the plurality of prefixes with the reducing based on the sorted plurality of prefixes.

5. The non-transitory computer-readable medium of claim 1, wherein the classifications are added by control plane components, and wherein the one or more reduction approaches utilize the classifications.

6. The non-transitory computer-readable medium of claim 5, wherein the classifications are any of priority-based, weightings, and hard partitioning per class.

7. The non-transitory computer-readable medium of claim 5, wherein the classifications are used for any of a current prefix and a next-hop prefix.

8. A method comprising:
obtaining a table having a plurality of prefixes each having a plurality of attributes and classifications;
receiving a size of the table and receiving a size of memory for storing the table, and determining whether or not there is a requirement to reduce the size of the table based thereon;
responsive to the requirement to reduce the size of the table, reducing a number of the plurality of prefixes based on one or more reduction approaches, configured by an operator to control reduction of the size of the table, that use any of the plurality of attributes and classifications, wherein the one or more reduction approaches are selected based on the operator's configuration and the requirement;
responsive to the requirement, obtaining an output table having some of the plurality of prefixes removed therefrom based on the one or more reduction approaches; and
providing the output table to a table receiver.

9. The method of claim 8, wherein the obtaining the table is via control plane components including one or more of Interior Gateway Protocol (IGP) and Border Gateway Protocol (BGP).

10. The method of claim 8, wherein, when there is no requirement to reduce the size, the output table has a same number of the plurality of prefixes as the table.

11. The method of claim 8, wherein the one or more reduction approaches utilize one or more of the plurality of attributes to sort the plurality of prefixes with the reducing based on the sorted plurality of prefixes.

12. The method of claim 8, wherein the classifications are added by control plane components, and wherein the one or more reduction approaches utilize the classifications.

13. The method of claim 12, wherein the classifications are any of priority-based, weightings, and hard partitioning per class.

14. The method of claim 12, wherein the classifications are used for any of a current prefix and a next-hop prefix.

15. A router comprising:
a plurality of ports and a switching fabric interconnecting the plurality of ports; and
a controller having memory for storing a forwarding table therein, wherein the controller is configured to
provide a size of the memory for the forwarding table, wherein the size of the forwarding table is determined to be less than a size of a table having a plurality of prefixes each having a plurality of attributes and classifications,
obtain a reduced size table that has a reduction in a number of the plurality of prefixes based on one or more reduction approaches, configured by an operator to control reduction of the size of the table, that use any of the plurality of attributes and classifications, wherein the one or more reduction approaches remove some of the plurality of prefixes from the forwarding table, wherein the one or more reduction approaches are selected based on the operator's configuration and the reduction, and
store the reduced size table in the memory.

16. The router of claim 15, wherein the table is obtained from control plane components including one or more of Interior Gateway Protocol (IGP) and Border Gateway Protocol (BGP).

17. The router of claim 15, wherein the one or more reduction approaches utilize one or more of the plurality of attributes to sort the plurality of prefixes with the reducing based on the sorted plurality of prefixes.

18. The non-transitory computer-readable medium of claim 1, wherein the one or more reduction approaches include i) classless or single class approaches that filter based on the attributes and ii) class-based approaches that filter based on the classifications.

19. The non-transitory computer-readable medium of claim 18, wherein
  the attributes include any of age, prefix-length, prefix-length per next hop, originating routing protocol, and any prefix record fields; and
  the classifications include a priority-based preference.

20. The non-transitory computer-readable medium of claim 18, wherein the one or more reduction approaches are selected by an arbiter based on the size of the memory, the requirement, and the operator's configuration.

\* \* \* \* \*